United States Patent
Andrews

(10) Patent No.: US 6,979,008 B2
(45) Date of Patent: Dec. 27, 2005

(54) APPARATUS FOR TRACTOR ACCESS AND STORAGE

(76) Inventor: Eugene C. Andrews, 3406 N. Riverside Dr., Lanexa, VA (US) 23098

( * ) Notice: Subject to any disclaimer, the term of this patent is extended or adjusted under 35 U.S.C. 154(b) by 386 days.

(21) Appl. No.: 10/260,050

(22) Filed: Sep. 27, 2002

(65) Prior Publication Data

US 2004/0061301 A1 Apr. 1, 2004

(51) Int. Cl.[7] .............................................. B60R 3/00
(52) U.S. Cl. ..................................... 280/164.1; 280/769
(58) Field of Search .............................. 280/163, 164.1, 280/164.2, 166, 769; 182/127, 222; D15/33

(56) References Cited

U.S. PATENT DOCUMENTS

| | | | | |
|---|---|---|---|---|
| 1,711,116 A | * | 4/1929 | Keenan ....................... | 280/163 |
| 4,013,136 A | | 3/1977 | Fear .......................... | 180/68.5 |
| 4,056,270 A | * | 11/1977 | Greenfield ................. | 280/166 |
| 4,102,432 A | * | 7/1978 | Bustin ........................ | 182/92 |
| 4,274,648 A | * | 6/1981 | Robins ....................... | 280/166 |
| 4,400,002 A | * | 8/1983 | Stillmunkes .............. | 280/164.2 |
| 4,749,191 A | * | 6/1988 | Gipson et al. ........... | 280/164.2 |
| 4,982,974 A | * | 1/1991 | Guidry ...................... | 280/164.2 |
| 5,326,213 A | | 7/1994 | Roberts ...................... | 414/392 |
| 5,944,332 A | * | 8/1999 | Lee et al. .................. | 280/163 |
| 6,017,045 A | * | 1/2000 | Dermody .................... | 280/169 |
| 6,068,277 A | | 5/2000 | Magnussen ................. | 280/166 |
| 6,209,682 B1 | | 4/2001 | Duffy et al. ................ | 182/127 |
| 6,224,134 B1 | * | 5/2001 | Johnson et al. ............. | 296/75 |
| 6,264,227 B1 | | 7/2001 | Johnson et al. ............. | 280/400 |

FOREIGN PATENT DOCUMENTS

| | | | | |
|---|---|---|---|---|
| EP | 210465 | * | 2/1987 | ................. 280/166 |
| JP | 2-92786 | * | 4/1990 | ................. 280/163 |

* cited by examiner

*Primary Examiner*—Frank Vanaman
(74) *Attorney, Agent, or Firm*—Floyd E. Ivey; Liebler, Ivey, Connor, Berry & St. Hilaire

(57) ABSTRACT

This is an apparatus providing access and storage for vehicles. More particularly, the invention constitutes step, stair or ladder access to the cab or sear of a tractor and utility storage for a vehicle or tractor operator. The apparatus is substantially planar and elongated extending from the vehicle to provide a step portion and a storage portion.

10 Claims, 9 Drawing Sheets

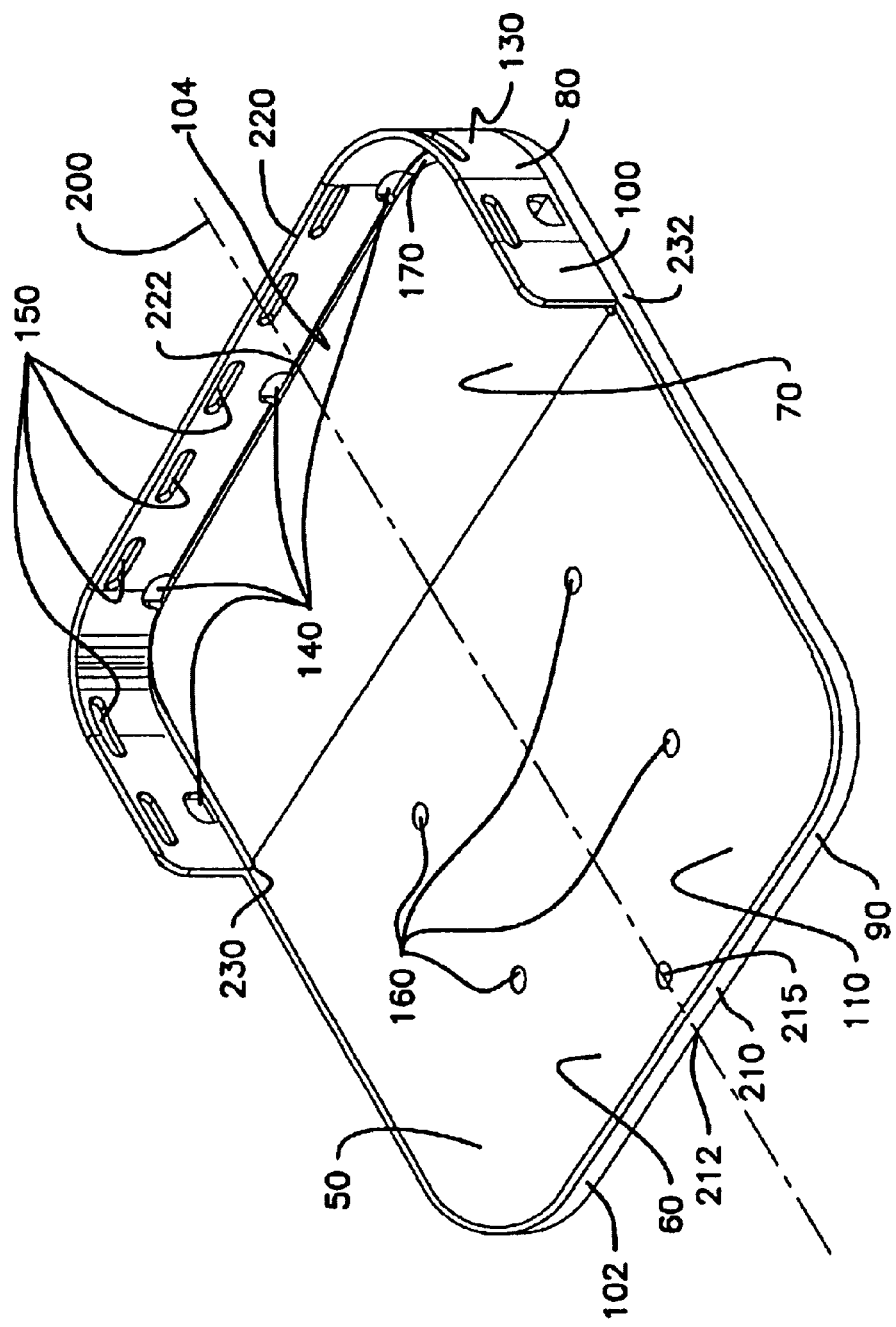
Fig. 1-A

APPARATUS FOR TRACTOR ACCESS AND STORAGE

FIELD OF THE INVENTION

The present invention relates generally to an apparatus for mounting a vehicle and for storage and, more particularly, to an apparatus for step access and utility storage for agricultural tractors.

BACKGROUND OF THE INVENTION

Agricultural Tractors require steps, stairs or ladders for use in accessing the cab or seat. Many tractors have limited or no storage space available for utility and other uses by the operator. Access apparatus is seen in the following patents: Duffy et al., U.S. Pat. No. 6,209,682; Johnson et al. U.S. Pat. No. 6,264,227; Magnussen, U.S. Pat. No. 6,068,277; Fear, U.S. Pat. No. 4,013,136; and Roberts, U.S. Pat. No. 5,326,213. The recited patents are disclosed in an Information Disclosure Statement.

SUMMARY OF THE INVENTION

The invention disclosed herein is an apparatus providing a step portion and a storage and utility portion for accessing a tractor cab or seat. The invention provides utility storage for the operation of the tractor.

BRIEF DESCRIPTION OF THE DRAWINGS

FIG. 1A shows a perspective of an embodiment of the apparatus showing a substantially planar elongated shelf (50) having a first and second portion (60, 70).

DETAILED DESCRIPTION

Figure 1:
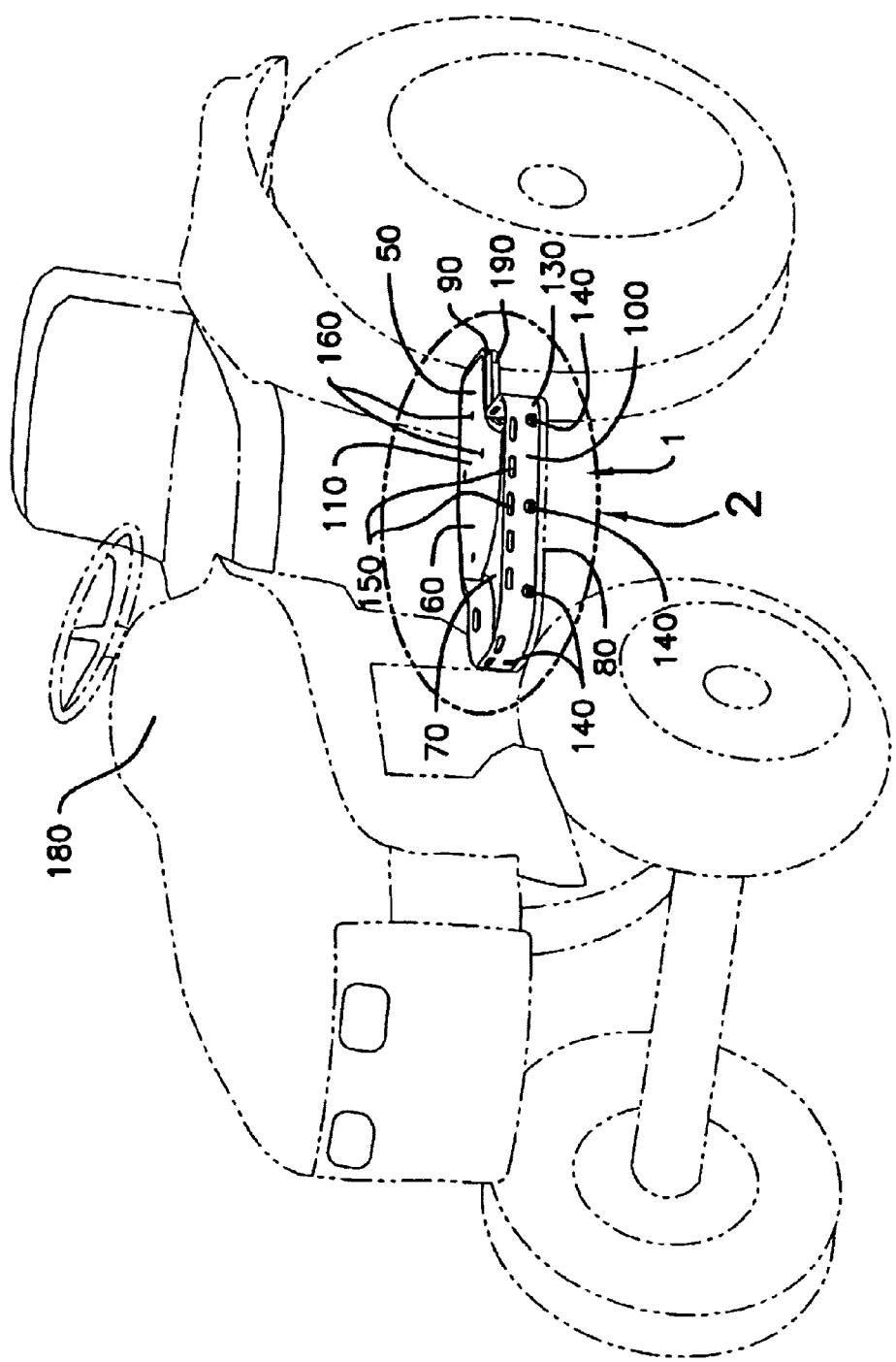
FIG. 1 depicts the preferred embodiment of the apparatus showing a first or step portion (60) and a second or storage portion (70) where the second portion (70) is offset from the first portion (60).
Figure 2:
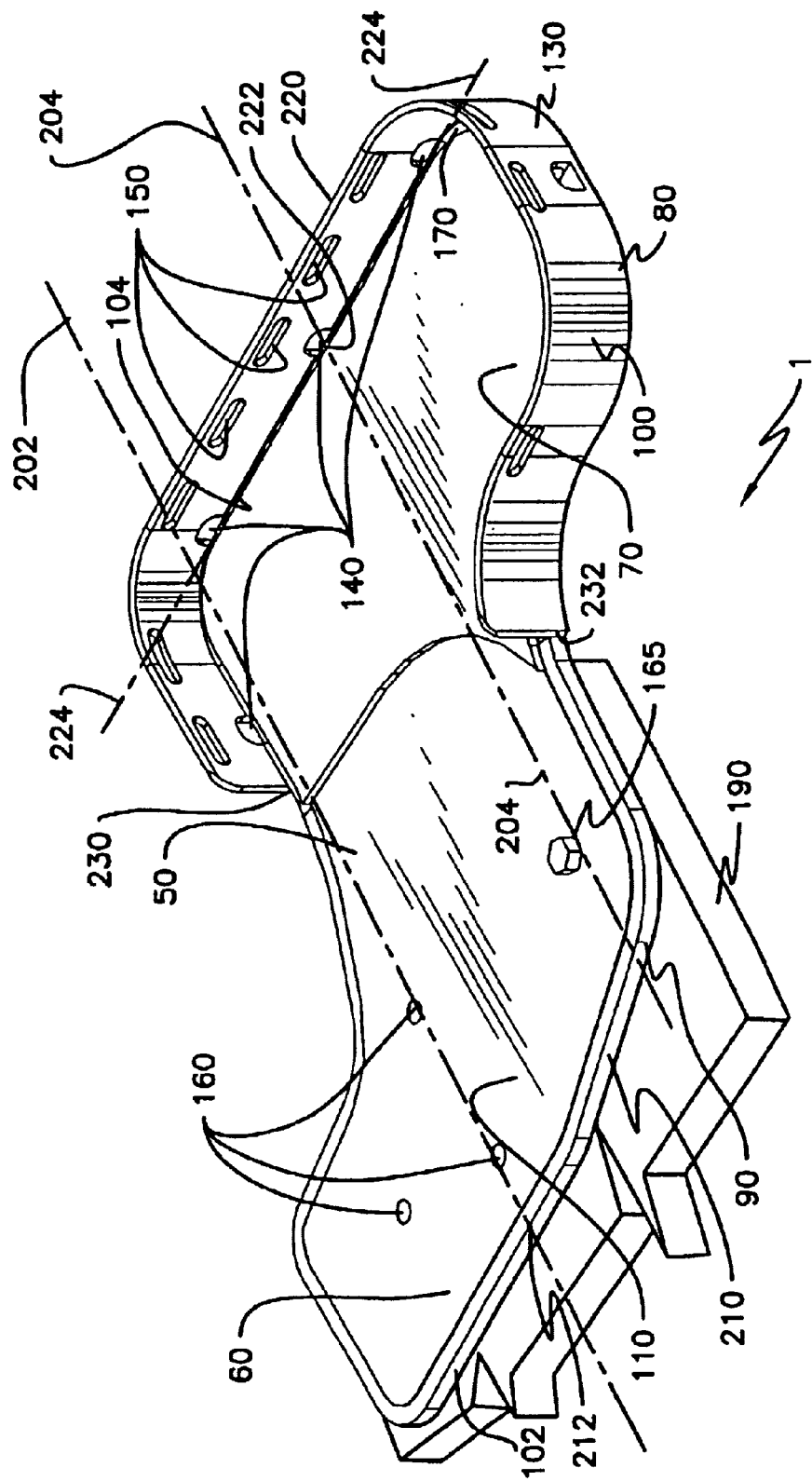
FIG. 2 depicts the preferred embodiment of the apparatus having a first portion (60) as a step and a second portion (70) as a storage portion. Depicted is a first end axis (202) from a first mid point (212) substantially parallel to a second end axis (204) from a second mid point (222) where the first end axis (202) is offset from the second end axis (204).
Figure 3:
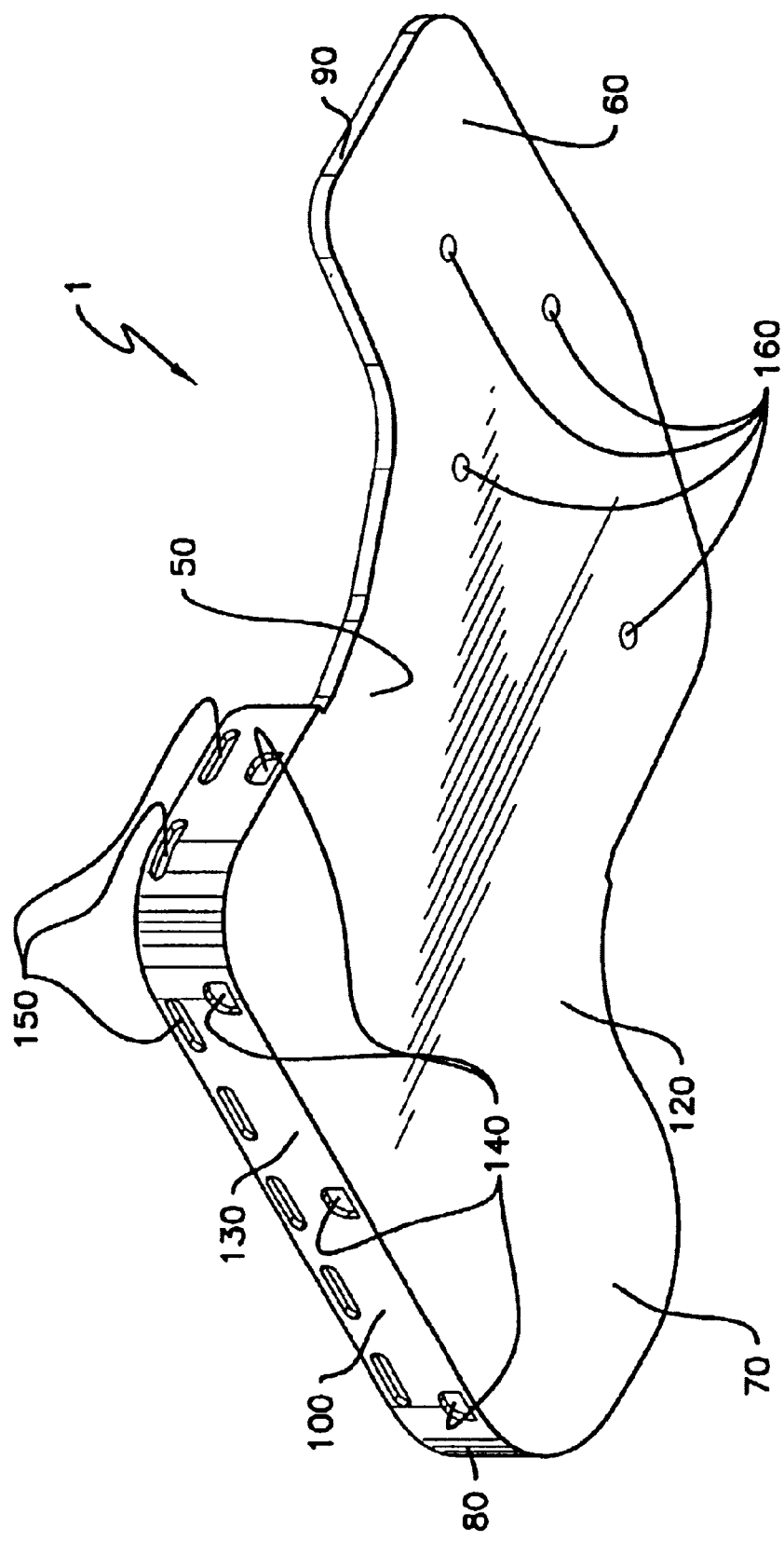
FIG. 3 depicts the apparatus as seen in FIG. 2 from the bottom.
Figure 4:
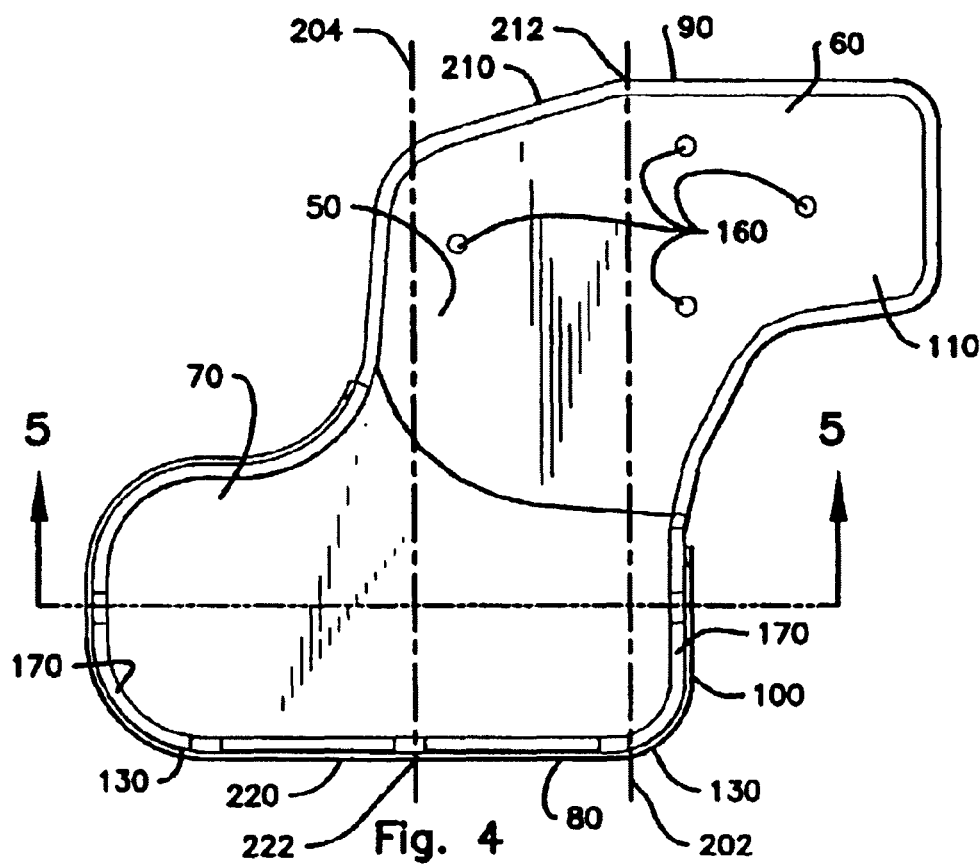
FIG. 4 is a top plan view of the apparatus of FIG. 2.
Figure 5:
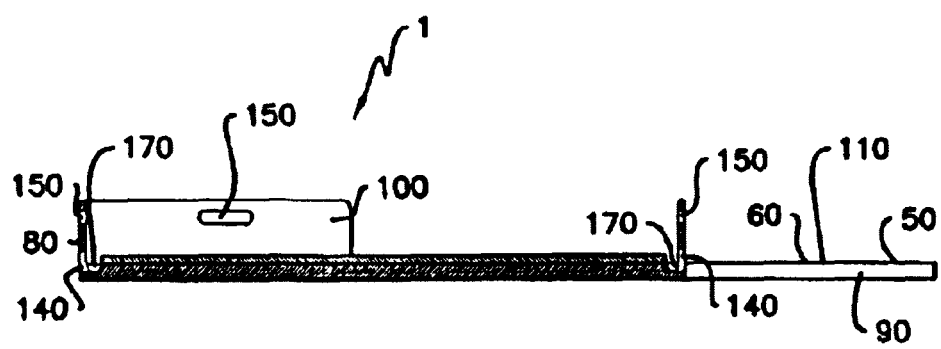
FIG. 5 is a section elevation of the apparatus of FIG. 2 taken at the second portion (70) viewing toward the first portion (60).
Figure 6:
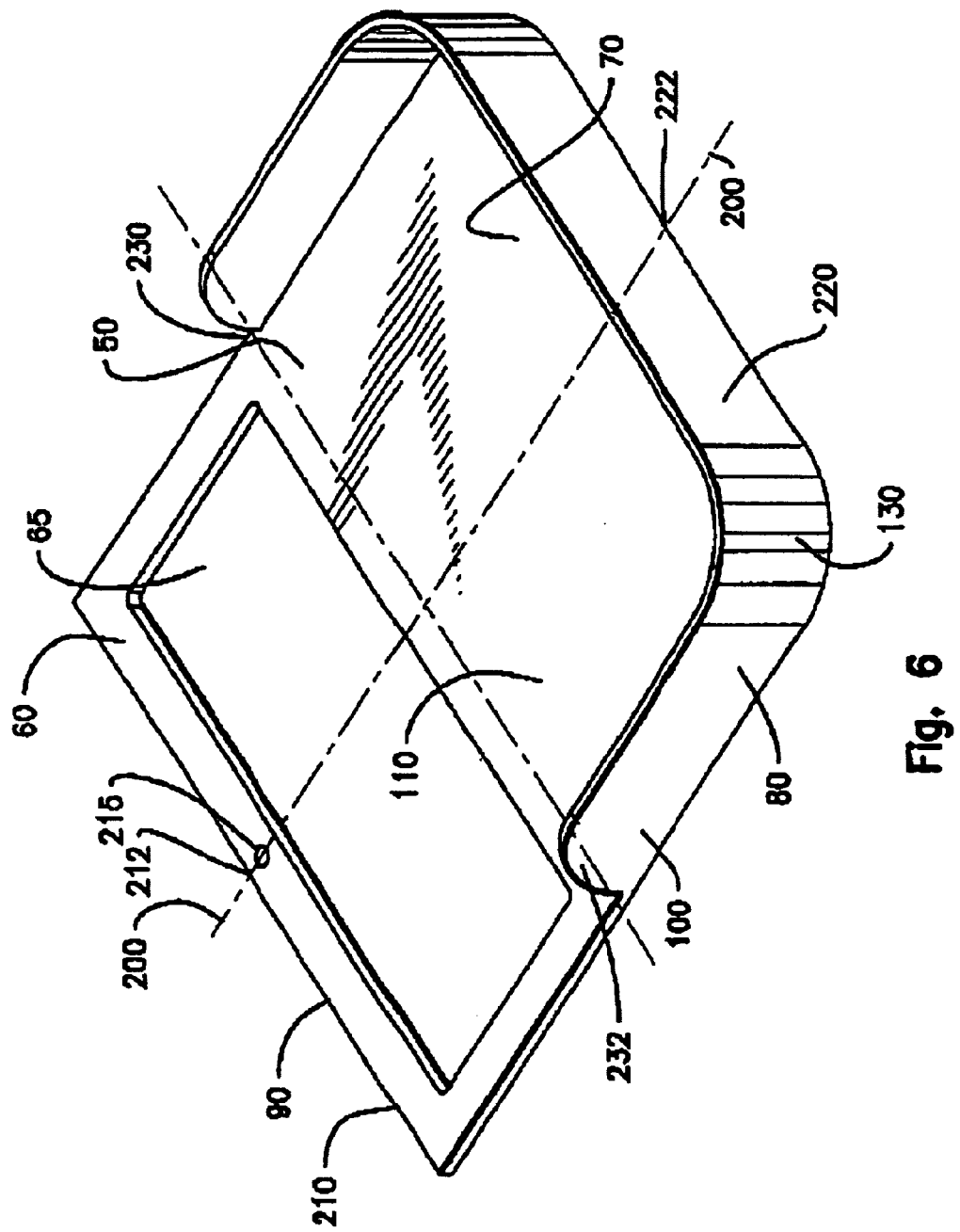
FIG. 6 is a perspective of an embodiment showing a first axis (200) from a first mid point (212) extending to a second mid point (222). Also depicted is a rail (130).
Figure 7:
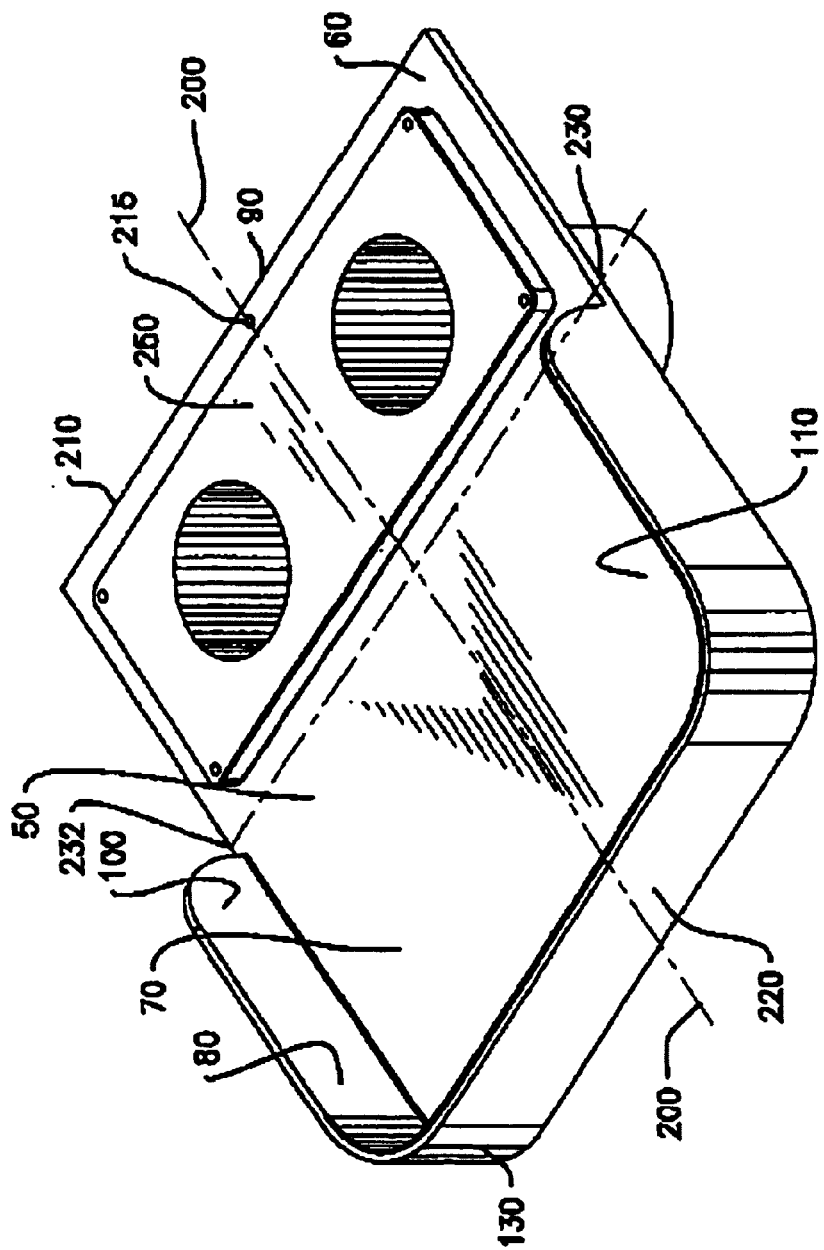
FIG. 7 is a perspective of an embodiment of FIG. 6 showing a utility tray (250).
Figure 8:
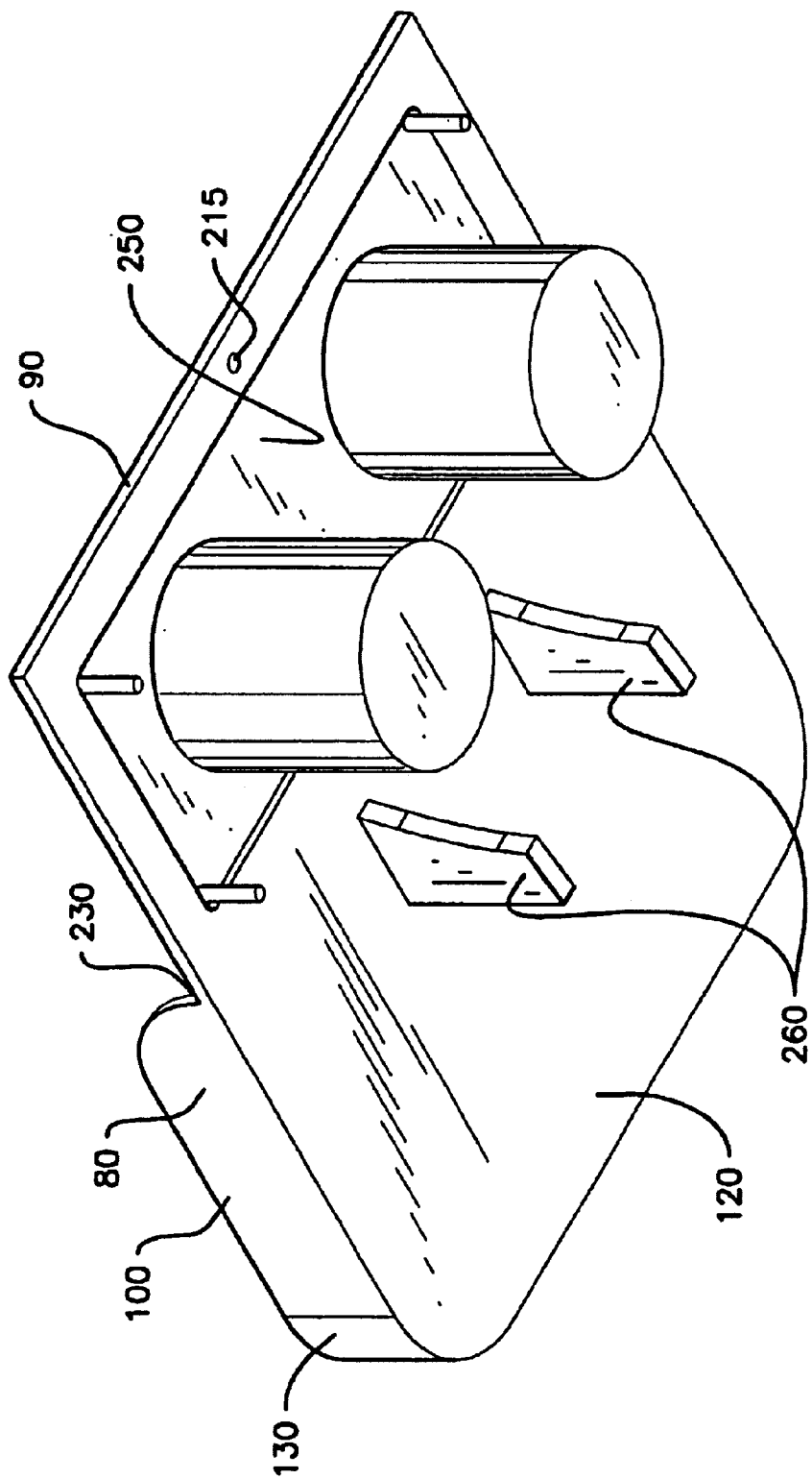
FIG. 8 is a perspective of the embodiment of FIG. 7 showing the bottom side (120) and support brace (260).
Figure 9:
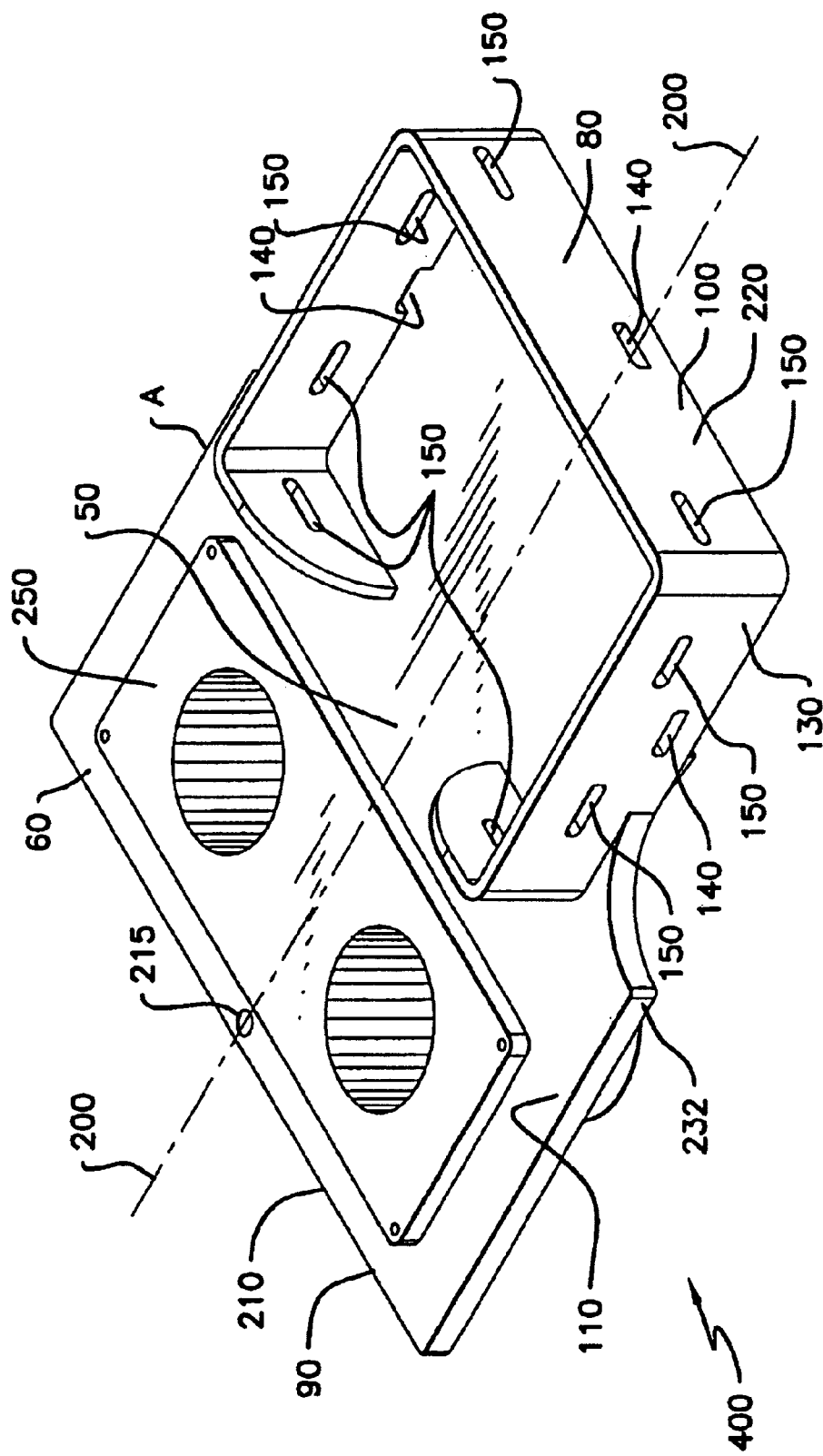
FIG. 9 is a perspective of an embodiment of the invention showing the rail (130) and utility tray (250).

Disclosed herein is a tractor mounting, utility and storage device (1) for use on a vehicle allowing a step or stair for accessing the cab or seat of a vehicle including a tractor. FIGS. 1, 1A, and 2–9 depict the embodiments and their elements. The invention is comprised of a substantially planar elongated shelf (50) having securing means to affix the substantially planar elongated shelf (50) to a vehicle (180). Securing means and affixing means is depicted as bolt apertures and bolts (160, 165) but may be welding or other means recognized by those of ordinary skill in such securing and affixing arts. The preferred embodiment contemplates the invention being received at a shelf support means (190) extending from the vehicle. This may be a step provided for the standard access to such a vehicle where such a step will have apertures to receive bolts or may be drilled to match apertures found at the invention at the first portion (60). The shelf support means (190) facilitates mounting the shelf (50) to the vehicle (180). Such a shelf support means (190) may be a structure welded or otherwise secured to the vehicle. However, it is contemplated that the shelf support means (190) will be a structure provided by the vehicle manufacturer. In the preferred embodiment the substantially planar elongated shelf (50) has a first portion (60), proximal the vehicle (180), which provides a step, stair or ladder structure and a second portion (70), distal from the vehicle (180), which may be used for utility storage.

The substantially planar elongated shelf (50) has a perimeter (80); the perimeter has a perimeter first portion (90) proximal the vehicle (180) and a perimeter second portion (100) distal from the vehicle (180). The first portion (60) has a first end (210) proximal the vehicle (180) and the second portion (70) having a second end (220) distal from the vehicle (180). The first end (210) has a first mid point (212); the second end (220) has a second mid-point (222); the first end (210) has a first edge (102) and the second end has a second edge (104); the first edge (102) is generally parallel to the second edge (104). The description of the first edge (102) and second edge (104) is for the purpose of identifying structure for the general location the first portion (60) relative to the second portion (70).

The first end (210) has a first end axis (202) from the first mid point (212); the first end axis (202) is substantially orthogonal to the first edge (102) extends away from the vehicle (180) and toward the second edge (104); the second end (220) has a second end axis (204) from the second mid point (222); the second end axis (204) is substantially orthogonal to the second edge (104) and extends toward the vehicle (180) and toward the first edge (102); the first end axis (202) is parallel to the second end axis (204). The shelf (50) has a top side (110) and a bottom side (120).

In one embodiment, seen in FIGS. 1A, and 6–9, a first axis (200); also described wherein axis alignment occurs is the instance where a first end axis (202) is aligned with the second end axis (204) such that the first end axis (202) extends through the second mid point (222) and the second end axis (204) extends through the first mid point (212).

Also found is the shelf (50) having a first side (230) and a second side (232); the perimeter second portion (100) extending from the first side (230) to the second side (232); the perimeter second portion (100) is intermediate the first end (210) and the second end (220) extending toward the second end (220) from the first side (230) to the second side (232). The rail is an upwardly extending rail (130) proximal the perimeter second portion (100) as seen in FIGS. 1, 1A, 2, 3, 6, 7, 8 and 9.

The top side has a slot depression, at the top side (110), forming a gutter (170) proximal the rail (130). The gutter (170) is formed of a slot which will receive water or other materials for ease in directing such waste material one or more drain apertures (140) which are proximal the gutter. The upwardly extending rail (130) has at least one gutter drain aperture (140) proximal the top side (110) and gutter (170) and at least one strap securing aperture (150) distal the top side (110); the gutter drain aperture (140) in flow communication with the gutter (170). The at least one strap securing aperture (150) will accommodate bungee cord hooks, ropes and other strap means as recognized by those of ordinary skill.

In one embodiment, seen in FIGS. 6–9, there is a utility aperture (65) from the top side (110) to the bottom side (120) intermediate the first end (220) and the second end (230). The utility aperture (65), at the first portion (60) proximal the first end (220), is sized to receive a utility tray (250) or other devices or tools as the operator may be inclined to use. In this embodiment there is at least one downwardly extending support brace (260) at the bottom side (120). It is understood that this embodiment will be secured to a vehicle and usually at a fender. Shown is a fender securing aperture (215), seen in FIG. 1A and FIGS. 6–9, which will generally receive a bolt with a butterfly nut which is also received by an aperture in the vehicle, and as contemplated here, at the vehicle fender. Also the at least one support brace (260) will rest on a portion of the vehicle such as a part of a vehicle fender. The at least one downwardly extending support brace (260) is generally intermediate the first end (210) and the second end (220).

In the preferred embodiment, as seen in FIGS. 1, and 2–4, the first end axis (202) is off set from the second end axis (204) such that the second portion (70) is oriented to one side of the first portion (60) permitting ease of access to the first portion (60) when such is used as a step.

The shelf (50) also has a first side (230) and a second side (232). The perimeter second portion (100) extends from the first side (230) to the second side (232); the perimeter second portion (100) is intermediate the first end (210) and the second end (220) extending toward the second end (220) from the first side (230) to the second side (232).

I claim:

1. A mounting, utility and storage device (1) for use on a vehicle comprising:
   a. a substantially planar elongated shelf (50);
   b. securing means to affix the substantially planar elongated shelf (50) to a vehicle (180); the vehicle having shelf support means (190) to facilitate mounting the shelf (50) to the vehicle (180);
   c. the substantially planar elongated shelf (50) having a first portion (60) proximal the vehicle (180) and a second portion (70) distal from the vehicle (180);
   d. the substantially planar elongated shelf (50) having a perimeter (80); the perimeter having a perimeter first portion (90) proximal the vehicle (180) and a perimeter second portion (100) distal from the vehicle (180);
   e. the shelf support means (190) comprised of a substantially planar surface having securing means (160) to receive affixing means (165) from the shelf (50) to the shelf support means (190);
   f. the first portion (60) having a first end (210) proximal the vehicle (180) and the second portion (70) having a second end (220) distal from the vehicle (180);
   g. the first end (210) having a first mid point (212); the second end (220) having a second mid-point (222); the first end (210) having a first edge (102) and the second end having a second edge (104); the first edge (102) parallel to the second edge (104);
   h. the first end (210) having a first end axis (202) from the first mid point (212); the first end axis (202) orthogonal to the first edge (102) extending toward the second edge (104); the second end (220) having a second end axis (204) from the second mid point (222); the second end axis (204) orthogonal to the second edge (104) extending toward the first edge (102); the first end axis (202) parallel to the second end axis (204);
   i. the shelf (50) having a top side (110) and a bottom side (120);
   j. the first end axis (202) aligned with the second end axis (204) such that the first end axis (202) extends through the second mid point (222) and the second end axis (204) extends through the first mid point (212);
   k. the shelf (50) having a first side (230) and a second side (232); the perimeter second portion (100) extending from the first side (230) to the second side (232); the perimeter second portion (100) is intermediate the first end (210) and the second end (220) extending toward the second end (220) from the first side (230) to the second side (232);
   l. an upwardly extending rail (130) proximal the perimeter second portion (100);
   m. a slot depression in the top side (110) forming a gutter (170) proximal the rail (130);
   n. the upwardly extending rail (130) having at least one gutter drain aperture (140) proximal the top side (110) and gutter (170) and at least one strap securing aperture (150) distal the top side (110); the gutter drain aperture (140) in flow communication with the gutter (170).

2. A mounting, utility and storage device according to claim 1 further comprising:
   an utility aperture (65) from the top side (110) to the bottom side (120) intermediate the first end (220) and the second end (230).

3. A mounting, utility and storage device according to claim 2 further comprising:
   the utility aperture (65) at the first portion (60) proximal the first end (220); the utility aperture (65) sized to receive a utility tray (250).

4. A mounting, utility and storage device according to claim 3 further comprising: at least one downwardly extending support brace (260) at the bottom side (120).

5. A mounting, utility and storage device according to claim 4 further comprising:
   the at least one downwardly extending support brace (260) intermediate the first end (210) and the second end (220).

6. A mounting, utility and storage device according to claim 1 further comprising:
   the first end axis (202) off set from the second end axis (204).

7. A mounting, utility and storage device according to claim 6 further comprising:
   an utility aperture (65) from the top side (110) to the bottom side (120) intermediate the first end (220) and the second end (230).

8. A mounting, utility and storage device according to claim 7 further comprising:
   the utility aperture (65) at the first portion (60) proximal the first end (220); the utility aperture (65) sized to receive a utility tray (250).

9. A mounting, utility and storage device according to claim 8 further comprising:
   at least one downwardly extending support brace (260) at the bottom side (120).

10. A mounting, utility and storage device according to claim 9 further comprising:
    the at least one downwardly extending support brace (260) intermediate the first end (210) and the second end (220).

* * * * *